Patented June 28, 1938

2,121,992

UNITED STATES PATENT OFFICE 2,121,992

PURIFICATION OF TITANIUM FLUORIDE SOLUTIONS

Melvin J. Sterba, Riverside, Ill., assignor, by mesne assignments, to The Sherwin-Williams Company, Cleveland, Ohio, a corporation of Ohio No Drawing. Application February 28, 1936, Serial No. 66,223

16 Claims. (Cl. 23—88)

This invention relates to the purification of aqueous solutions and particularly to the removal of colloidal and other materials suspended therein.

It is the object of this invention to provide a method for purifying aqueous solutions with titanium compounds and particularly solutions of titanium fluoride salts whereby it is possible to produce therefrom a titanium hydrate of such purity that when calcined it produces a titanium oxide of brilliant whiteness. When incorporated in the proper vehicle such a titanium oxide makes a white paint having highly desirable characteristics.

In the production of titanium oxide suitable for pigment purposes by the fluoride process as described in U. S. applications Serial Nos. 614,043 filed May 27, 1932 (now Patent No. 2,042,434, granted May 26, 1936) and 745,753 filed September 27, 1934, (now Patent No. 2,042,435, granted May 26, 1936) a titanium bearing ore is digested with an ammonium fluoride salt at elevated temperatures, preferably in the presence of water at about 100° to 175° C., though the reaction may be carried out in the dry way. Such ores, for example, ilmenite and rutile, contain silicon compounds as impurities. The rutile contains iron compounds as impurities, whereas the ilmenite is composed of titanium and iron oxide compounds (probably in chemical combination) in varying proportions. These ores usually contain other impurities in small amounts such as heavy metals other than iron. The iron and heavy metals must be substantially entirely removed from the resulting titanium compounds so that the resulting titanium oxide may have the required whiteness and brilliancy. The silicon which is present as an impurity in the ore reacts in a manner similar to titanium in the fluoride process and the resultant titania contains this silicon in the form of silica. Since the oxide of silicon is white or colorless it does not affect appreciably the whiteness and brilliancy of the titania if present in small amounts and therefore does not have to be removed.

When the titanium-bearing raw material is digested with the ammonium fluoride salt, which term includes the bifluoride and compounds which under the conditions of reaction form ammonium fluoride, the titanium, silicon, iron and other heavy metal compounds react to form fluoride salts. The titanium and silicon form fluoride salts which are water soluble under neutral or non-alkaline conditions. Because of the decomposition of at least a part of the ammonium fluoride to the bifluoride due to the instability of the ammonium fluoride at the reacting temperatures the final reaction product is non-alkaline and the fluoride salts of titanium and silicon may be removed therefrom by leaching with water. The iron forms a double fluoride with ammonium which is soluble only to a slight degree in water and even less soluble in water containing ammonium fluoride in solution. However, this small amount of iron is sufficient to cause titania made therefrom, without further purification, to be off-color.

The reaction mass is leached with water. The leach liquor contains the soluble fluoride salts of titanium and silicon together with the excess ammonium fluoride in the form of the bifluoride and traces of iron fluoride and other heavy metal salts. A considerable amount of ammonium fluoride usually is present since the decomposition reaction is preferably carried out in the presence of a large excess of ammonium fluoride over the stoichiometrical quantities required for the production of the simple fluorides of titanium and iron as set forth in said applications. This excess is necessary to digest substantially all of the titanium in the ore. The bulk of the iron and ammonium double fluoride remains insoluble in the leach liquor and preferably is filtered therefrom.

The filtered leach liquor containing the small amounts of iron and usually other heavy metal impurities is now treated to remove these impurities before the titanium is precipitated in the form of the hydrate as described in said Serial No. 745,753 (now Patent No. 2,042,435). The iron fluoride remaining in the leach liquor may be precipitated and removed by adding a soluble sulphide to the solution after it has been made substantially neutral as described in Svendsen Patent No. 2,042,436, granted May 26, 1936. Neutralization is accomplished desirably through the addition of ammonia, it being added to the point at which the addition of more ammonia precipitates a titanium compound. This point, designated as "substantially neutral" for convenience hereinafter, is usually at a pH of about 6.8, and must be closely maintained until the precipitated sulphides are removed from this solution. After neutralization is attained, a convenient soluble sulphide such as ammonium sulphide, is added to the solution. Sodium or potassium sulphides and hydrogen sulphide are other soluble sulphides that may be used. If hydrogen sulphide is used, additional alkali is required to maintain the necessary neutrality or the iron sulphide is redissolved. The iron and other heavy metals dissolved in the titanium fluoride salt solution are precipitated as sulphides either in a hot or a cold solution, a hot solution being preferred, 50°–60° C. being a desirable temperature range.

Although the iron sulphide and other sulphides thereby formed may be allowed to settle and the supernatant liquid decanted, it is more desirable to filter the solution. The resulting filtrate, however, usually contains a small amount of iron sulphide in a colloidal condition and possibly other colloidal materials which are not removed by the filtering operation. This residual iron which is precipitated with or absorbed by the titanium hydrate when the titanium is subsequently precipitated with ammonia, usually is present in sufficient amounts to cause the titanium oxide obtained by the calcination of the hydrate to be off-color slightly. I have found that it is possible to remove such materials in colloidal suspension including the colloidal iron sulphide, sulphur and other metal sulphides by agitating the filtered solution containing these colloidal particles with a flocculent titanium compound preferably formed in situ. The flocculent compound formed as described hereinafter and agitated with the solution to be purified, has the property of either adsorbing or otherwise enmeshing the colloidal particles. The flocculent material is then removed from the solution of titanium fluoride salt by decantation or filtration. The resultant clarified solution is treated with ammonia for the precipitation of the titanium hydrate as described in said applications.

I have found that it is possible to form the flocculent precipitate having the desired properties only under certain conditions and with certain compounds especially when the titanium fluoride salt solution is of the concentration desirable for the precipitation of the hydrate in commercial operations. Such a solution usually contains about 5% of the fluoride salt of titanium expressed as $TiO_2$. In general certain sodium salts give excellent results. The several phosphates of sodium including the mono-, di- and tri-phosphates may be used, the tri-sodium phosphate being most efficient because of its basicity. Upon the addition of any of these phosphates either undissolved or in water solution, to the neutral solution of fluoride salt of titanium a flocculent titanium compound separates out of solution. This is agitated with the liquid and then removed, preferably by filtering. It is necessary to precipitate only a small proportion of the titanium in solution in this way to clarify the entire volume. The sodium phosphate seems to be specific in its action since the mono-sodium phosphate, though an acid salt, may be used, and furthermore, potassium phosphate does not react in the same way. In addition to forming a flocculent titanium compound the sodium phosphate seems to form an insoluble compound with iron which may be in solution. On the other hand, a soluble potassium salt such as the phosphate precipitates what appears to be a potassium fluotitanate rather than the insoluble iron salt which seems to be formed when sodium phosphate is used. If, however, a small amount of sodium hydroxide is added when potassium phosphate is used the sodium phosphate reaction apparently occurs. Microcosmic salt, a double phosphate of sodium and ammonium, also may be used although ammonium phosphate alone does not give the desired result. Sodium phosphate, therefore, may be used to purify a solution which has not been treated previously with the soluble sulphide probably because of the referred-to specific reaction with the dissolved iron in addition to the formation of the flocculent titanium compound precipitate. The insoluble iron salt thereby formed is removed from the solution with the flocculent titanium compound.

Sodium hydroxide and sodium carbonate, because of their basicity, also may be used to form a flocculent titanium compound precipitate which probably is a hydrate. When these compounds are used, the iron must first be made insoluble, as by reaction with a sulphide, if substantially all of the dissolved iron is to be removed by the flocculent titanium compound formed by them. These basic compounds apparently do not react with the dissolved iron as does the sodium phosphate to form a filterable iron compound. Potassium hydroxide may be used instead of the sodium hydroxide but it is not as effective since potassium fluotitanate which is but slightly soluble in water seems to be formed and precipitated simultaneously to thereby cut down the efficiency of the reaction in forming the flocculent compound. The temperature at which this operation is carried out is not important.

Although the filterable sulphides formed after the addition of the soluble sulphide may be removed from the solution prior to the treatment with the flocculent compound this is not necessary. After the solution is sulphided the flocculating compound such as the sodium hydroxide may be added immediately and without removing the insoluble sulphides formed thereby, the solution agitated and the mixture of flocculent titanium compound, sulphides and other colloidal particles removed at one time. This is the preferred procedure since it saves one filtering operation.

Ammonia cannot be used instead of the sodium hydroxide or carbonate, because if ammonia is added directly to such a solution containing the excess ammonium fluoride previously referred to, the titanium does not precipitate as a flocculent hydrate but precipitates as a crystalline salt as described in Serial No. 745,753 (now Patent No. 2,042,435). This crystalline salt does not have the desired adsorbing or enmeshing properties.

Of necessity, because of the cost involved, the amount of the flocculating agent which is added usually is small as compared to the total amount of titanium in solution. For example 160 grams of sodium hydroxide are added to 175 pounds of a titanium fluoride salt solution which contains 5% to 5½% of titanium expressed as $TiO_2$. Equivalent, that is, equimolar amounts of sodium carbonate or sodium phosphate are used.

If a silicon fluoride salt is present in the solution with the titanium fluoride salt the same procedure is used since the action of the flocculating agent seems to be unchanged. Possibly a flocculent silicon compound is formed simultaneously with the titanium compound which may have an adsorbing and clarifying action similar to that of the titanium compound. The purified solution resulting therefrom containing both the titanium and silicon fluoride salts may then be treated with ammonia to form the mixed hydrates.

It is possible also to form by means of the said sodium and potassium compounds the flocculent titanium compound separately from the main solution which is to be treated. The flocculent compound is then added to the remainder of the solution to be purified. Unless the presence of soluble sodium salts in the fluoride solutions is objectionable this procedure does not have any advantage over that described and is not necessary since the addition of the sodium salt to the titanium fluoride salt solution does not form a crystalline salt as is the case when ammonia is added to it. The flocculent titanium compound so formed out of a separate solution may, however, be used as the filtering medium for the solution containing the colloidal particles. In this embodiment of my invention a layer of the flocculent titanium compound separately formed is laid down on a suitable filter cloth or other filter structure and the solution passed through it, thereby removing the colloidal particles. Where a filter-layer of the stable flocculent titanium compound is used other solutions than the described fluoride solution may be clarified. For example ammonia water containing small amounts of iron compounds in suspension that cannot be removed by ordinary filtering means, may be passed through a filter layer of the aforesaid titanium compound and the iron substantially completely removed.

It is obvious that the physical properties of the flocculent titanium compound which give it its adsorbing power must remain stable until the solution to be clarified is no longer in contact with it. The character of such flocculent compounds sometimes changes rapidly after they are formed or when they contact with the solutions to be clarified, the adsorbing characteristics sometimes being lost.

Whenever a stable flocculent titanium compound is referred to, it refers to one which does not lose its adsorbing or enmeshing properties, when brought into contact with the solution to be clarified under normal conditions of use except when used beyond its adsorbing capacity. Adsorbing is used broadly and refers to the property of adsorbing or enmeshing colloidal particles in water suspension and retaining these so that the colloidal particles so adsorbed or enmeshed are removed from the solution when the adsorbing compound is removed therefrom.

I claim:

1. The method of removing suspended particles from a water solution of a titanium fluoride salt which comprises forming in situ in said solution a small amount of stable flocculent titanium compound precipitate, agitating said precipitate with said solution and separating said precipitate therefrom.

2. The method of removing suspended particles from a water solution of fluoride salts including a titanium fluoride salt, which comprises adding to said solution a compound capable of forming a stable flocculent titanium compound precipitate with said titanium fluoride salt in such proportion that a small amount thereof is formed, agitating said precipitate with said solution and filtering said precipitate therefrom.

3. The method of removing suspended particles from a water solution of a titanium fluoride salt which comprises adding to a titanium fluoride salt solution a compound taken from the group consisting of sodium phosphate, sodium hydroxide, sodium carbonate and potassium hydroxide under such conditions that a stable adsorbent flocculent titanium compound is formed, agitating said flocculent compound with said first solution and separating said compound from said solution.

4. The method of removing suspended particles from a water solution of a titanium fluoride salt which comprises adding to said solution an amount of compound taken from the group consisting of sodium phosphate, sodium hydroxide, sodium carbonate and potassium hydroxide whereby a small amount of titanium compound is precipitated, agitating said precipitate with said solution and separating said precipitate therefrom.

5. The method of treating a water solution of a titanium fluoride salt containing dissolved iron which comprises adding to said solution sufficient sodium phosphate to form a small amount of flocculent titanium compound, agitating said precipitate with said solution and separating said precipitate therefrom.

6. The method of treating a water solution of a titanium fluoride salt containing dissolved iron which comprises neutralizing said solution and precipitating said iron from said neutral solution, forming a stable flocculent titanium compound precipitate, agitating said precipitate with said solution and separating said precipitate therefrom.

7. The method of treating a water solution of a titanium fluoride salt containing a dissolved heavy metal which comprises adding a soluble sulphide to a substantially neutral solution of said titanium salt, forming a stable flocculent titanium compound precipitate, agitating said precipitate with said solution and separating said precipitate therefrom.

8. The method of treating a water solution of a titanium fluoride salt containing a dissolved heavy metal which comprises adding a soluble sulphide to a substantially neutral solution of said salt, adding a compound to said solution which precipitates a stable flocculent titanium compound therein, agitating said precipitate with said solution and separating said precipitate therefrom.

9. The method of treating a water solution of a titanium fluoride salt containing a dissolved heavy metal which comprises adding a soluble sulphide to a substantially neutral solution thereof, adding a sodium salt to said solution capable of forming a stable flocculent precipitate therewith, agitating said precipitate with said solution and separating said precipitate therefrom.

10. The method of treating a water solution of a titanium fluoride salt containing a dissolved heavy metal which comprises adding a soluble sulphide to a substantially neutral solution thereof, adding sodium hydroxide to said solution in an amount whereby a small amount of titanium compound is precipitated, agitating said precipitate with said solution and separating said precipitate therefrom.

11. The method of treating a water solution of a titanium fluoride salt containing a dissolved heavy metal which comprises adding a soluble sulphide to a substantially neutral solution thereof, adding sodium carbonate to said solution in an amount whereby a small amount of titanium compound is precipitated, agitating said precipitate with said solution and separating said precipitate therefrom.

12. The method of treating a water solution of a titanium fluoride salt containing a dissolved heavy metal which comprises adding a soluble sulphide to a substantially neutral solution thereof, adding sodium phosphate to said solution in an amount whereby a small amount of titanium compound is precipitated, agitating said precipitate with said solution and separating said precipitate therefrom.

13. The method of removing suspended particles from a water solution of fluoride salts comprising titanium, ammonium and silicon which comprises adding to said solution a salt capable of forming therewith a stable flocculent titanium compound precipitate, the amount of salt being such that a limited amount of precipitate is formed agitating said precipitate with said solution and separating said precipitate therefrom.

14. In the method of making a substantially iron-free solution of a titanium fluoride salt from a titanium-bearing ore containing iron, dissolving said ore by means of the reaction with an ammonium fluoride salt, leaching the reaction product with water, neutralizing the leach liquor, adding a soluble sulphide to said substantially neutral leach liquor and adding to said sulphided leach liquor a compound capable of forming a stable flocculent precipitate therewith, agitating said precipitate with said solution and separating said precipitate therefrom.

15. In the method of treating a water solution of a titanium fluoride salt to remove a heavy metal impurity therefrom, the combination of steps which comprises adding sodium hydroxide to said solution in an amount whereby a small amount of titanium compound is precipitated, and thoroughly mixing said precipitate therewith.

16. In the method of treating a water solution of a titanium fluoride salt to remove a heavy metal impurity therefrom, the combination of steps which comprises adding a compound taken from the group consisting of sodium phosphate, sodium hydroxide, sodium carbonate and potassium hydroxide to said solution in an amount whereby a small amount of titanium compound is precipitated, and thoroughly mixing said precipitate therewith.

MELVIN J. STERBA.